(12) United States Patent
Kashiwagi et al.

(10) Patent No.: US 11,255,449 B2
(45) Date of Patent: Feb. 22, 2022

(54) VALVE DEVICE

(71) Applicant: AISIN SEIKI KABUSHIKI KAISHA, Kariya (JP)

(72) Inventors: Koichi Kashiwagi, Kariya (JP); Toshihide Yamada, Kariya (JP); Nobutaka Kiku, Kariya (JP)

(73) Assignee: AISIN CORPORATION, Kariya (JP)

( * ) Notice: Subject to any disclaimer, the term of this patent is extended or adjusted under 35 U.S.C. 154(b) by 102 days.

(21) Appl. No.: 16/577,130

(22) Filed: Sep. 20, 2019

(65) Prior Publication Data

US 2020/0103039 A1    Apr. 2, 2020

(30) Foreign Application Priority Data

Sep. 27, 2018  (JP) .............................. JP2018-182435
Sep. 27, 2018  (JP) .............................. JP2018-182436

(51) Int. Cl.
*F16K 11/085*    (2006.01)
*F16K 27/06*    (2006.01)

(52) U.S. Cl.
CPC ........ *F16K 11/0853* (2013.01); *F16K 27/065* (2013.01)

(58) Field of Classification Search
CPC ............. F16K 11/0853; F16K 11/0873; F16K 27/065; F16K 5/0605; F16K 5/0689; F16K 5/201
See application file for complete search history.

(56) References Cited

U.S. PATENT DOCUMENTS

| 2,591,102 | A | * | 4/1952 | Snyder | ................ | F16K 11/0853 |
| | | | | | | 137/625.16 |
| 4,103,868 | A | * | 8/1978 | Thompson | ............ | F16K 5/0605 |
| | | | | | | 251/283 |
| 4,542,878 | A | * | 9/1985 | Kulisek | ................ | F16K 5/0605 |
| | | | | | | 251/315.13 |
| 5,435,521 | A | * | 7/1995 | Jarecki | ................ | F16K 5/0605 |
| | | | | | | 137/238 |

(Continued)

FOREIGN PATENT DOCUMENTS

| JP | 11125343 A | 5/1999 |
| JP | 2008095811 A | 4/2008 |

(Continued)

*Primary Examiner* — Michael R Reid
(74) *Attorney, Agent, or Firm* — Buchanan Ingersoll & Rooney PC (57) ABSTRACT

A valve device includes: a housing having an inner peripheral wall defining a cylindrical space therein; a fluid introduction path formed in the housing to communicate with the cylindrical space; fluid discharge paths formed in the housing to communicate with the cylindrical space; a valve body accommodated in the cylindrical space and formed of a spherical body having a communication path communicating the fluid introduction path with at least one of the fluid discharge paths; a valve body rotating mechanism rotating the valve body about an axis of the cylindrical space; a protrusion protruding from the inner peripheral wall toward the axis of the cylindrical space to surround at least a portion of an opening in the fluid introduction path; and a seal member provided on the protrusion and capable of abutting on the valve body.

6 Claims, 6 Drawing Sheets

(56) References Cited

U.S. PATENT DOCUMENTS

| | | | |
|---|---|---|---|
| 7,059,585 B2* | 6/2006 | Dalluge | F16K 5/20 |
| | | | 251/315.16 |
| 7,712,724 B2* | 5/2010 | Thomas | F16K 11/0873 |
| | | | 251/314 |
| 7,775,502 B2 | 8/2010 | Ohta | |
| 7,836,909 B2* | 11/2010 | Church | F16K 5/0605 |
| | | | 137/15.22 |
| 9,038,988 B1* | 5/2015 | Beechy | F16K 5/20 |
| | | | 251/315.16 |
| 2015/0075453 A1 | 3/2015 | Oikawa | |
| 2018/0034087 A1 | 2/2018 | Watanabe et al. | |
| 2019/0072191 A1 | 3/2019 | Shen et al. | |

FOREIGN PATENT DOCUMENTS

| | | |
|---|---|---|
| JP | 2012145124 A | 8/2012 |
| JP | 2012145154 A | 8/2012 |
| JP | 2013245738 A | 12/2013 |
| JP | 2017166569 A | 9/2017 |
| JP | 2018018683 A | 2/2018 |
| JP | 2018080724 A | 5/2018 |

* cited by examiner

VALVE DEVICE

CROSS REFERENCE TO RELATED APPLICATIONS

This application is based on and claims priority under 35 U.S.C. § 119 to Japanese Patent Applications 2018-182435 and 2018-182436, both filed on Sep. 27, 2018, the entire contents of which are incorporated herein by reference.

TECHNICAL FIELD

This disclosure relates to a valve device capable of limiting communication between a fluid introduction path and a fluid discharge path.

BACKGROUND DISCUSSION

In the related art, a fluid is used in various devices. Various valves are provided in a device in order to control flow of the fluid. As this kind of valve, for example, a list of references that indicate the source thereof is as follows.

JP 2017-166569A (Reference 1) discloses a flow rate control valve including a cylindrical housing having a plurality of communication holes through which a fluid flows, a spherical valve body accommodated in the housing and having a fluid inlet portion and a plurality of openings communicating with the respective communication holes in the housing, and a seal member which prevents leakage of the fluid between the housing and the valve body. In the flow rate control valve, the seal member is biased to the valve body side by a spring provided on the opposite side of the valve body.

JP 2012-145124A (Reference 2) discloses a valve including a rotor having a fan shape in a plan view, a cylindrical body in which the rotor is rotatably accommodated, a pair of ports for the inflow and the outflow of a fluid to and from the cylindrical body, and an annular seal member provided in close contact with the peripheral surface of the rotor. In this valve, the annular seal member is configured such that the axial length thereof is longer on the downstream side in the rotational direction than on the upstream side in the rotational direction of the rotor for making the ports from the opened state to the closed state. Further, the rotor is configured such that, when the rotor approaches the seal member, the radial length on the rotor side remote from the seal member is longer than the radial length on the rotor side close to the seal member. Thus, the seal member comes into contact with the rotor only when blocking the fluid, which prevents the wear of the seal member.

JP 2008-095811A (Reference 3) discloses a ball valve including a spherical valve body and a housing in which the valve body is accommodated, the housing being provided with an annular seat member. The valve body is configured so as not to come into contact with the seat member during rotation and is configured so as to come into contact with the seat member when blocking a flow path. In addition, a member (second shaft) capable of preventing the wear of the seat member is provided between the valve body and the seat member.

JP 2012-145154A (Reference 4) discloses a valve device including a valve body, a housing, and a seat member. In this valve device, the leakage of a fluid between the valve body and the housing is prevented by the seat member, and a seat member fixing unit is used to fix the seat member.

Further, in the related art, electrification of vehicles has been considered in order to reduce global environmental pollution due to exhaust gases of vehicles. As one example of such a vehicle, for example, there is one using a fuel cell as a power source as disclosed in JP 2018-018683A (Reference 5).

It is known that the power generation performance of a fuel cell provided in a fuel cell system disclosed in Reference 5 changes significantly due to the wet condition of a membrane in a fuel cell stack. Thus, in a technology disclosed in Reference 5, the air that has passed through a humidifier is supplied to the stack when the membrane is in a dry state, and the air that has bypassed the humidifier is supplied to the stack when the membrane is in a wet state. For this reason, a supply side on-off valve which controls the flow of air to the humidifier and a bypass supply path and an on-off valve which controls the flow of air to the bypass supply path are provided. Further, in order to prevent deterioration of the stack while the vehicle stops, each of the supply side on-off valve and the on-off valve needs to have a sealing function. The technology disclosed in Reference 5 has room for cost reduction, and it is conceivable to integrate a plurality of valves into one as one method of cost reduction (e.g., JP 2013-245738A (Reference 6) and JP 2018-080724A (Reference 7)).

A rotary type valve disclosed in Reference 6 is configured to include a rotor which opens and closes a flow path according to rotation and a casing in which the rotor is accommodated, and a casing opening serving as a fluid path is provided in the inner surface of the casing. A cylindrical seal member is provided in the casing opening so as to abut on the outer peripheral surface of the rotor.

A control valve disclosed in Reference 7 is configured to include a housing, a valve body accommodated in the housing, and a seal member provided between a communication hole in the housing and the outer peripheral surface of the valve body. The outer peripheral edge of the seal member is chamfered to prevent damage to the seal member.

The valve device disclosed in the above-described Reference 4 is configured to include the spherical valve body, the housing in which the valve body is accommodated, and the annular seat member inside the housing. When flowing a fluid, this is performed in a state where the valve body and the seat member are not in contact with each other.

The technology disclosed in Reference 1 is composed of the spherical valve body and the cylindrical housing, and there exists a location where the seal member is not supported. For this reason, the seal member may be deformed by the pressure difference between the upstream side and the downstream side of the flow rate control valve or the rotation of the valve body, thus failing in proper sealing.

The technology disclosed in Reference 2 is configured by exchanging the radial length of the fan-shaped rotor or the axial length of the seal member. For example, there is a possibility that the sealability of the seal member is significantly degraded when positional displacement occurs in the circumferential direction in the course of disposing the seal member.

The technology disclosed in Reference 3 causes cost increase since a separate member is used to prevent deformation of a seal member. In addition, since the seal member is fixed, the load on the seal member may greatly vary due to dimensional variation such as axial displacement of the valve body and the housing, and in such a case, variation in the rotational torque of the valve body also increases.

The technology disclosed in Reference 4 is excellent in anti-wear measures since the valve body and the seat member are not in contact with each other during the flow of a fluid, but are in contact with each other when the fluid does not flow. However, since the seat height is changed according to the rotor diameter, when the seat member is displaced in the circumferential direction, this greatly affects sealing performance.

Further, when sealing is performed by bringing the seal member into contact with the outer peripheral surface of the rotor as in the technology disclosed in Reference 6, displacement of the seal member in the circumferential direction greatly affects the sealability of the seal member, and the sealability is degraded even by slight displacement in the circumferential direction. Further, since a rubber seal is used as the seal member, sliding resistance is increased, which causes an increase in the size of a motor. Furthermore, since the rubber seal and the rotor are always in contact with each other when the sliding resistance is large, the wear of the seal member becomes remarkable.

In the technology disclosed in Reference 7, since the seal member always slides with respect to the rotor, there is a possibility that the wear of the seal member is increased as in the technology disclosed in Reference 2. Therefore, although it is conceivable to use a resin component having a small coefficient of friction, a resin may not provide the sealability required from the fuel cell system.

As described above, the technology of Reference 4 is excellent in anti-wear measures since the valve body and the seat member are not in contact with each other during the flow of a fluid, but are in contact with each other when the fluid does not flow. However, since the seat height is changed according to the rotor diameter, when the seat member is displaced in the circumferential direction, this greatly affects sealing performance.

Thus, a need exists for a valve device which is not susceptible to the drawback mentioned above.

SUMMARY

A feature of a valve device according to an aspect of this disclosure resides in that the valve device includes a housing having a cylindrical inner peripheral wall that defines a cylindrical space therein, a fluid introduction path formed in the housing to communicate with the cylindrical space at the inner peripheral wall, a plurality of fluid discharge paths formed in the housing to communicate with the cylindrical space at the inner peripheral wall, a valve body accommodated in the cylindrical space, the valve body being formed of a spherical body having therein a communication path that communicates the fluid introduction path with at least one of the plurality of fluid discharge paths, a valve body rotating mechanism configured to rotate the valve body about an axis of the cylindrical space as a rotation axis in the cylindrical space, a protrusion protruding from the inner peripheral wall of the housing toward the axis of the cylindrical space to surround at least a portion of an opening in the fluid introduction path at the inner peripheral wall of the housing, and a seal member provided on the protrusion and capable of abutting on the valve body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A valve device disclosed here is configured such that a seal member is not easily deteriorated. Hereinafter, a valve device 1 of the present embodiment will be described.

Figure 1:
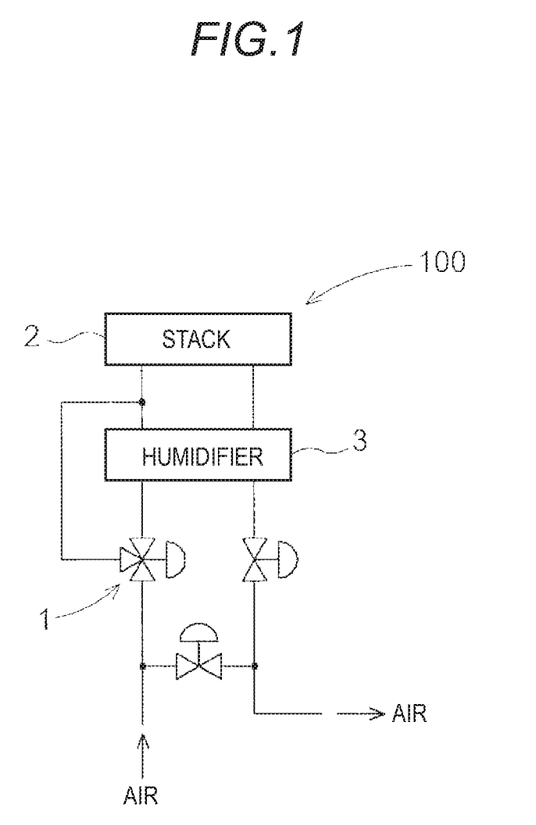
FIG. 1 is a view illustrating an application example of a valve device.

An application example of the valve device 1 of the present embodiment is illustrated in FIG. 1. The valve device 1 controls the amount of humidification of air supplied to a stack 2 of a vehicle fuel cell system 100 and the amount of air supplied to the stack 2. Specifically, when a membrane in the stack 2 is in a dry state, a flow path is switched to supply the air that has passed through a humidifier 3 to the stack 2, and when the membrane in the stack 2 is in a wet state, the flow path is switched to supply the air that has bypassed the humidifier 3 to the stack 2. The valve device 1 is configured to enable such flow path switching.

Figure 2:
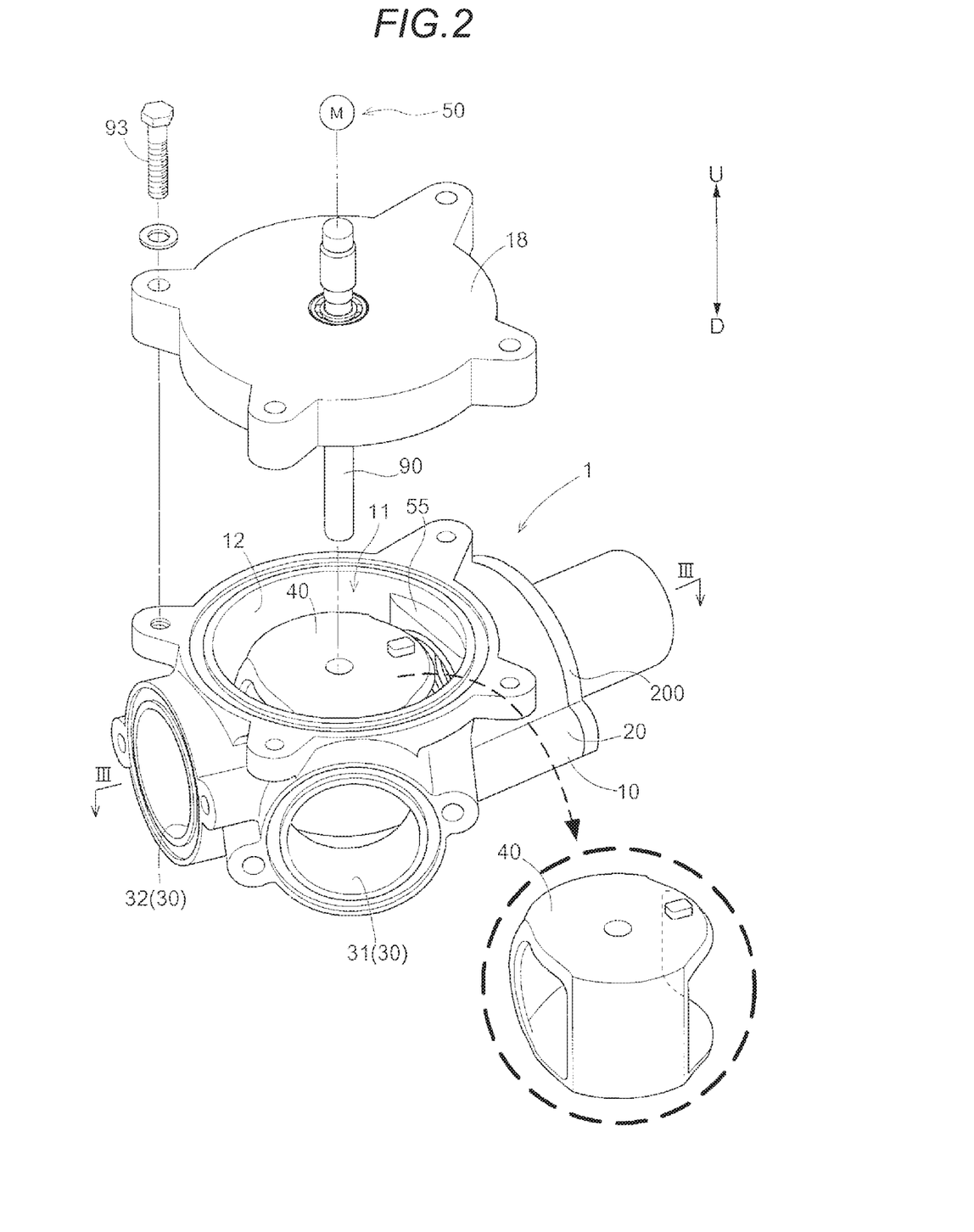
FIG. 2 is a perspective view of a valve device.
Figure 3:
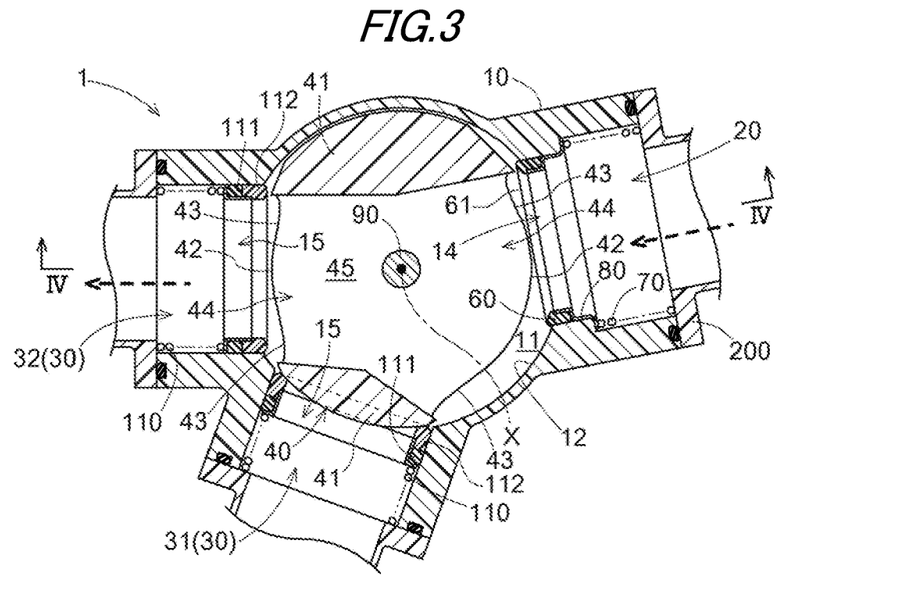
FIG. 3 is a cross-sectional view taken along line III-III in FIG. 2.
Figure 4:
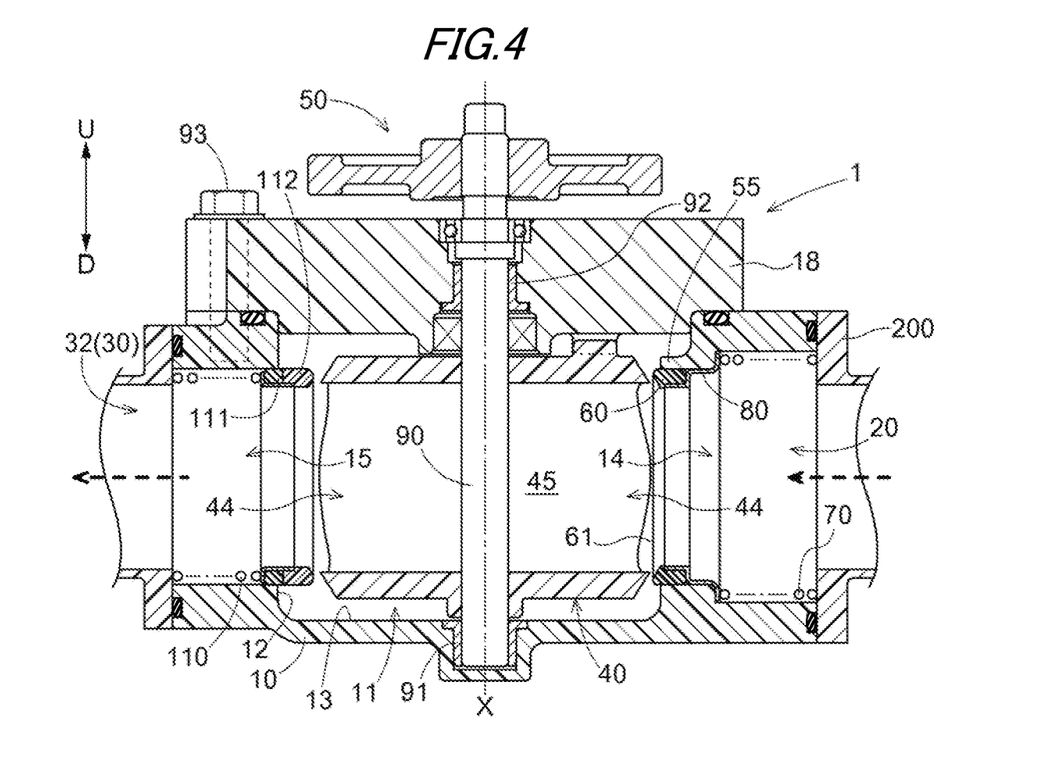
FIG. 4 is a cross-sectional view taken along line IV-IV in FIG. 3.

FIG. 2 illustrates a perspective view of the valve device 1. FIG. 3 illustrates a cross-sectional view taken along line III-III in FIG. 2. FIG. 4 illustrates a cross-sectional view taken along line IV-IV in FIG. 3. As illustrated in FIGS. 2 to 4, the valve device 1 includes a housing 10, a fluid introduction path 20, a fluid discharge path 30, a valve body 40, a valve body rotating mechanism 50, a protrusion 55, a seal member 60, and a biasing member 70, and a restricting mechanism 80.

Here, in order to facilitate understanding, in the present embodiment, unless otherwise particularly mentioned, "up" refers to the direction of the arrow U along the vertical direction of the valve device 1 in the state illustrated in FIGS. 2 and 4 and "down" refers to the direction of the arrow D along the vertical direction of the valve device 1 in the state illustrated in FIGS. 2 and 4.

The housing 10 has a cylindrical inner peripheral wall 12 defining a cylindrical space 11 therein. In the present embodiment, the housing 10 is formed using a resin such that the cylindrical space 11 is defined by the inner peripheral wall 12. The inner peripheral wall 12 is configured such that a cross section thereof orthogonal to the axis X of the cylindrical space 11 exhibits a circular shape. In the present embodiment, the space 11 is surrounded by the inner peripheral wall 12 and a bottom surface 13 which have a uniform inner diameter centered on the axis X. Thus, the space 11 is configured so as to be surrounded by a bowl-shaped wall.

The fluid introduction path 20 is formed in the housing 10 and communicates with the cylindrical space 11 at the inner peripheral wall 12. The fluid introduction path 20 serves as an introduction path to the valve device 1 of a fluid, the flow rate of which is controlled by the valve device 1. An opening 14 is provided in the inner peripheral wall 12 of the housing 10, and the fluid introduction path 20 communicates with the space 11 through the opening 14. In the present embodiment, the housing 10 is provided with one fluid introduction path 20.

The fluid discharge path 30 is formed in the housing 10 and communicates with the cylindrical space 11 at the inner peripheral wall 12. The fluid discharge path 30 serves as a discharge path from the valve device 1 of the fluid, the flow rate of which is controlled by the valve device 1. The inner peripheral wall 12 of the housing 10 is provided with another opening 15 different from the opening 14 described above, and the fluid discharge path 30 communicates with the space 11 through the opening 15. Although a plurality of fluid discharge paths 30 are provided in the housing 10, in the present embodiment, two fluid discharge paths 30 are provided.

Here, although not particularly limited, in the present embodiment, the opening 14 and two openings 15 are respectively formed with the same inner diameter. In addition, in order to facilitate understanding, when distinguishing the two fluid discharge paths 30 from each other, one closer to the fluid introduction path 20 along the circumferential direction (at the upstream side) will be described as a first fluid discharge path 31 and the other one far from the fluid introduction path 20 along the circumferential direction (at the downstream side) will be described as a second fluid discharge path 32.

The valve body 40 is configured with a spherical body. In the present embodiment, as illustrated in FIG. 4, the valve body 40 is formed in a shape in which the upper and lower sides of the spherical body are cut to planes orthogonal to the axis X, but may be formed without being particularly cut. Further, in the present embodiment, the valve body 40 is formed using a resin similarly to the housing 10, and is accommodated in the cylindrical space 11 of the housing 10 described above.

As illustrated in FIG. 3, the valve body 40 is configured not to have a circular arc (not a perfect circle) having a single inner radius but to have curves having a plurality of inner radii or straight lines in a plan view (as viewed in the direction along the axis X). Specifically, the valve body 40 has a large radius portion 41, a small radius portion 42, and an intermediate portion 43.

The large radius portion 41 is formed with a predetermined first inner radius corresponding to the inner radius of the inner peripheral wall 12 of the housing 10 in a plan view. As described above, the inner peripheral wall 12 of the housing 10 has a uniform inner diameter centered on the axis X. The large radius portion 41 is formed with the first inner radius which is an inner radius less than the inner radius of the inner peripheral wall 12 so as not to abut on the inner peripheral wall 12 when rotated about the axis X as a rotation axis. Although not particularly limited, the difference between the inner radius of the inner peripheral wall 12 and the first inner radius may be set to form at least a gap such that the valve body 40 does not abut on the inner peripheral wall 12 (to prevent the occurrence of sliding resistance) when rotated about the axis X as a rotation axis.

In the present embodiment, as illustrated in FIG. 3, the large radius portion 41 is provided at two locations along the circumferential direction of the valve body 40. The positions of respective large radius portions in the circumferential direction are set such that, when one large radius portion 41 is positioned to face the inner peripheral wall 12 between the fluid introduction path 20 and the second fluid discharge path 32, the other large radius portion 41 is positioned to be able to close the opening 15 in the first fluid discharge path 31. Thus, the circumferential positions of the large radius portions 41 are set according to the circumferential positions of the fluid discharge paths 30.

The small radius portion 42 is formed with a second inner radius less than the first inner radius. The first inner radius is the inner radius of the large radius portion 41. Thus, as illustrated in FIG. 3, the small radius portion 42 is configured to have an inner radius less than that of the large radius portion 41. As described above, the large radius portion 41 forms a gap with the inner peripheral wall 12 such that the large radius portion 41 does not abut on the inner peripheral wall 12 when rotated about the axis X as a rotation axis. A gap having a greater radial length (a gap having a greater volume) than the gap between the large radius portion 41 and the inner peripheral wall 12 is formed between the small radius portion 42 and the inner peripheral wall 12.

In the present embodiment, as illustrated in FIG. 3, the small radius portion 42 is provided at two locations along the circumferential direction of the valve body 40. The positions of respective small radius portions in the circumferential direction are set such that, when one small radius portion 42 is positioned to face the fluid introduction path 20, the other small radius portion 42 is positioned to face the opening 15 in the second fluid discharge path 32. Thus, the circumferential positions of the small radius portions 42 are set according to the circumferential positions of the fluid introduction path 20 and the fluid discharge path 30.

The intermediate portion 43 is formed to connect the large radius portion 41 and the small radius portion 42, and the distance of the intermediate portion 43 from the axis X is set to be intermediate in size between the first inner radius and the second inner radius. The expression "the intermediate portion 43 is formed to connect the large radius portion 41 and the small radius portion 42" means that the intermediate portion 43 is provided between the large radius portion 41 and the small radius portion 42 in a plan view of the valve body 40. In the present embodiment, each of the large radius portion 41 and the small radius portion 42 is provided at two locations. Thus, the intermediate portion 43 is provided at four locations to connect the respective large radius portions 41 and the respective small radius portions 42. The expression "the distance of the intermediate portion 43 from the axis X is set to be intermediate in size between the first inner radius and the second inner radius" means that an inner radius of the intermediate portion 43 is set to an inner radius between the first inner radius of the large radius portion 41 and the second inner radius of the small radius portion 42. Here, the inner radius between the first inner radius of the large radius portion 41 and the second inner radius of the small radius portion 42 is not a single inner radius but an inner radius, the magnitude of which changes within a range of the first inner radius of the large radius portion 41 and the second inner radius of the small radius portion 42. The intermediate portion 43 may be formed in a smooth arc shape in a plan view. That is, the intermediate portion 43 may be configured such that the inner radius thereof gradually changes. Further, the intermediate portion 43 may be formed to have an acute angle portion that has an acute angle in a plan view.

The valve body 40 includes therein a communication path 45 which enables communication between the fluid introduction path 20 and at least one of the plurality of fluid discharge paths 30. In the present embodiment, as illustrated in FIG. 3, an opening 44 which is opened in both the small radius portion 42 and the intermediate portion 43 is provided at two locations along the circumferential direction of the valve body 40. Further, as illustrated in FIG. 4, these openings 44 are provided in the side surface of the valve body 40 which is in a state of being accommodated in the space 11. In addition, each opening 44 may be open to at least one of the small radius portion 42 and the intermediate portion 43. Further, the outer edge portion of the opening 44 may be configured to have an arc shape in a top view.

The communication path 45 communicates with at least one of the openings 44 provided at the two locations described above and penetrates the valve body 40 in the radial direction. In the present embodiment, the valve body 40 is controlled to enable switching between a first communication state of mainly communicating the communication path 45, the fluid introduction path 20, and the first fluid discharge path 31, a second communication state of mainly communicating the communication path 45, the fluid introduction path 20, and the second fluid discharge path 32, and a blocking state of blocking the fluid introduction path 20 and both the first fluid discharge path 31 and the second fluid discharge path 32.

A rotation shaft 90 is inserted through a radial central portion of the valve body 40 along the direction of the axis X, and the valve body 40 is accommodated in the space 11 of the housing 10. The rotation shaft 90 is coaxial with the axis X, and one end thereof is supported by the bottom surface 13 via a support member 91. The upper side of the space 11 is closed in a fluid tight manner by a lid member 18 which the rotation shaft 90 penetrates. In the present embodiment, the other side of the rotation shaft 90 is supported by the lid member 18 via a support member 92. Further, the lid member 18 is fastened and fixed to the housing 10 by a bolt 93.

The valve body rotating mechanism 50 rotates the valve body 40 in the cylindrical space 11 via the rotation shaft 90 about the axis X as a rotation axis. The valve body rotating mechanism 50 is configured to have a motor M, and rotates the rotation shaft 90 in response to an instruction from a host system. The valve body 40 is rotated in response to this instruction, thereby being switched to any of the first communication state, the second communication state, and the blocking state described above.

Figure 5:
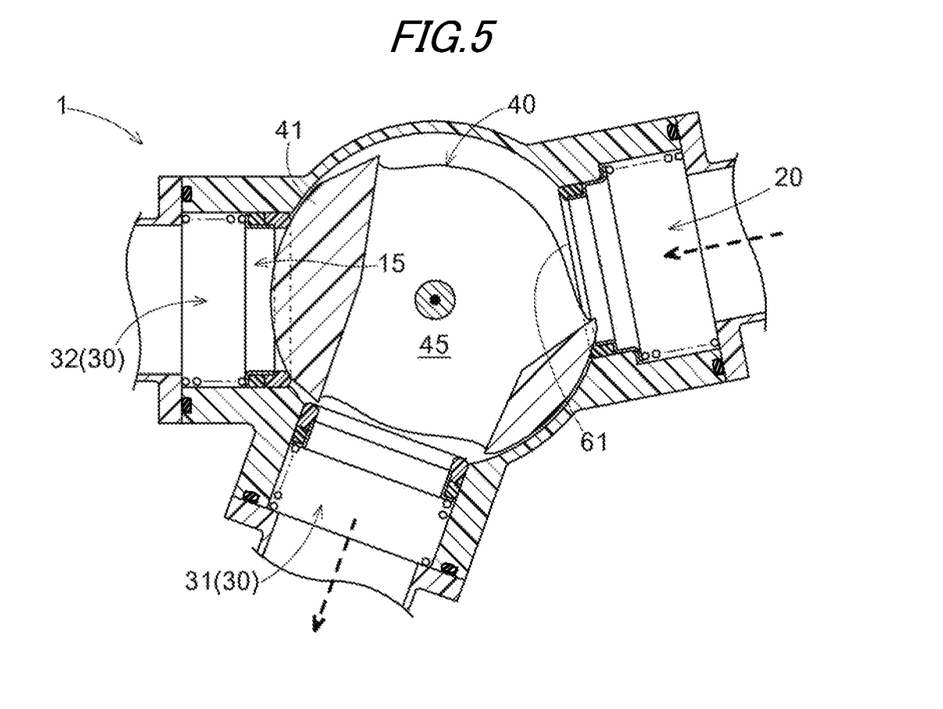
FIG. 5 is a cross-sectional view of a second communication state.

In the first communication state, as illustrated in FIG. 5, the fluid introduction path 20 and the first fluid discharge path 31 mainly communicate with each other by the communication path 45 of the valve body 40, and the opening 15 in the second fluid discharge path 32 is closed by the large radius portion 41. In the second communication state, as illustrated in FIG. 3, the fluid introduction path 20 and the second fluid discharge path 32 mainly communicate with each other by the communication path 45 of the valve body 40, and the opening 15 in the first fluid discharge path 31 is closed by the large radius portion 41.

In addition, the second fluid discharge path 32 in the first communication state may not be completely closed, but may be closed such that the amount of fluid flowing through the second fluid discharge path 32 is less than the amount of fluid flowing through the first fluid discharge path 32 in the first communication state. Further, the first fluid discharge path 31 in the second communication state may not be completely closed, but may be closed such that the amount of fluid flowing through the first fluid discharge path 31 is less than the amount of fluid flowing through the second fluid discharge path 32 in the second communication state.

Figure 6:
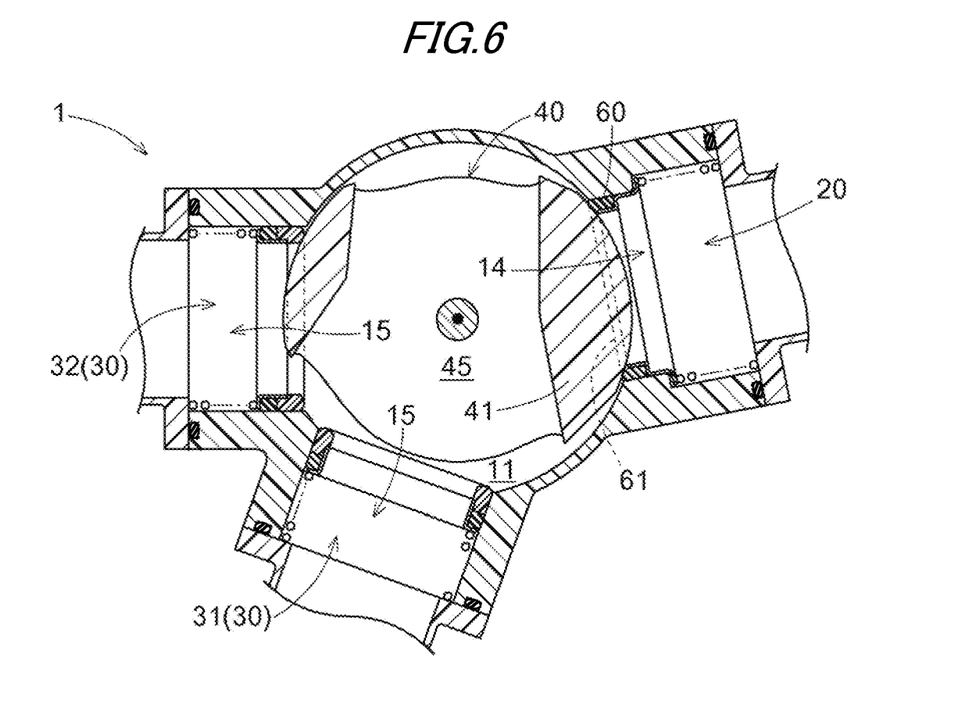
FIG. 6 is a cross-sectional view of a non-communication state.

In the blocking state, as illustrated in FIG. 6, the large radius portion 41 of the valve body 40 closes the opening 14 in the fluid introduction path 20. In this state, the fluid introduction path 20 and the communication path 45 do not communicate with each other, and the fluid flowing through the fluid introduction path 20 is not introduced into the communication path 45. At this time, each of the opening 15 in the first fluid discharge path 31 and the opening 15 in the second fluid discharge path 32 may be closed by the valve body 40 or may not be closed by the valve body 40. In either case, the opening 14 in the fluid introduction path 20 is closed by the large radius portion 41, which may prevent the fluid from being introduced into the space 11 (the communication path 45).

Here, the inner peripheral wall 12 of the housing 10 is provided with the protrusion 55 which protrudes from the inner peripheral wall 12 of the housing 10 toward the axis X of the cylindrical space 11 to surround at least a portion of the opening 14 in the fluid introduction path 20 at the inner peripheral wall 12 of the housing 10. The expression "the protrusion 55 which protrudes from the inner peripheral wall 12 of the housing 10 toward the axis X of the cylindrical space 11 to surround at least a portion of the opening 14 in the fluid introduction path 20 at the inner peripheral wall 12 of the housing 10" refers to that at least a portion of the fluid introduction path 20 is extended in a cylindrical shape from the edge of the opening 14 which is opened in the inner peripheral wall 12 toward the axis X of the space 11. A protruding portion from the inner peripheral wall 12 formed by extending at least a portion of the fluid introduction path 20 in this manner corresponds to the protrusion 55. In the present embodiment, as illustrated in FIGS. 3 and 4, the protrusion 55 is provided to connect both the lateral edges of the opening 14 in the fluid introduction path 20. In other words, the housing 10 is not completely cylindrical, and as viewed in a top view, has a D-shaped form in which a flat surface is formed only at a location where the seal member 60 (to be described later) is inserted.

In the present embodiment, the protrusion 55 is configured such that the distance from the axis X to the protrusion 55 is greater than the second inner radius which is the inner radius of the small radius portion 42. Thus, the fluid introduction path 20 provided with the protrusion 55 may be prevented from being closed when the valve body 40 is rotated such that at least the small radius portion 42 is located in front of the fluid introduction path 20. Further, through the provision of such a configuration, the valve body 40 may be accommodated and assembled in the space 11 of the housing 10 in a state where the circumferential positions of the protrusion 55 and the small radius portion 42 with respect to the axis X are aligned with each other.

The seal member 60 is provided to reliably prevent the introduction of the fluid from the fluid introduction path 20 to the space 11 in the blocking state. The seal member 60 is provided on the protrusion 55 and is provided so as to abut on the large radius portion 41 of the valve body 40. The seal member 60 is formed according to the shape of an inner peripheral surface 55A of the end of the protrusion 55. In the present embodiment, since the inner peripheral surface 55A of the end of the protrusion 55 has a circular shape as viewed in the radial direction from the axis X, the seal member 60 is formed such that a cross section thereof orthogonal to the flow direction of the fluid flowing through the fluid introduction path 20 (hereinafter simply referred to as "axial direction") has a circular cylindrical shape corresponding to the shape of the inner peripheral surface 55A.

The seal member 60 is formed of an elastic material (e.g., a rubber member), and is provided such that one axial end thereof is inserted into the opening 14 and the protrusion 55 of the housing 10 and the other axial end thereof protrudes into the space 11. The amount (length) by which the seal member 60 protrudes to the space 11 side is set such that the large radius portion 41 abuts on a tip end 61 (corresponding to "the other axial end") of the seal member 60 as illustrated in FIG. 6 such that the fluid introduction path 20 and the space 11 do not communicate with each other when the valve body 40 is rotated by the valve body rotating mechanism 50 to shift to the blocking state. At this time, an outer peripheral portion of the seal member 60 fluid-tightly abut on (internally fitted in) the housing 10 (the inner peripheral surface 55A of the protrusion 55), which prevents the fluid from leaking from a gap between the seal member 60 and the protrusion 55 into the space 11. This makes it possible to reliably prevent the introduction of the fluid into the space 11 in the blocking state.

Meanwhile, in the first communication state and the second communication state, the fluid from the fluid introduction path 20 needs to be introduced into the space 11 (the communication path 45). Therefore, in the first and second communication states, the seal member 60 is provided in a state where the tip end 61 on the valve body 40 side (corresponding to "the other axial end") does not abut on the small radius portion 42.

Figure 7:
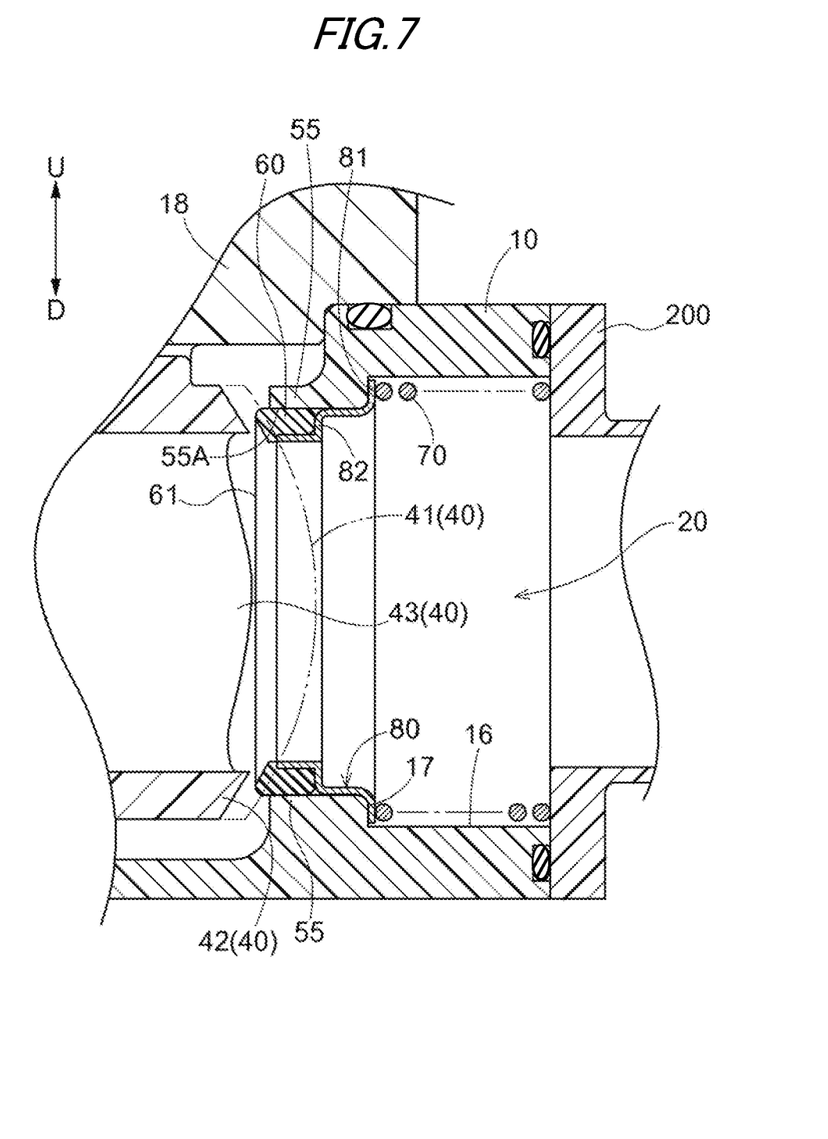
FIG. 7 is an enlarged view of a seal portion.

FIG. 7 is an enlarged view of a seal portion by the seal member 60. In FIG. 7, the inner radius corresponding to the first inner radius of the large radius portion 41 is indicated by a two-dot chain line. In the blocking state, the seal member 60 and the large radius portion 41 abut on each other, and in the first and second communication states, as illustrated in FIG. 7, the seal member 60 and the small radius portion 42 do not abut on each other.

In this way, the amount (length) by which the seal member 60 protrudes into the space 11 is set such that the seal member 60 is prevented from abutting on the small radius portion 42 by the restricting mechanism 80 to be described later even when the valve body 40 is rotated about the rotational central axis X. Thus, since the seal member 60 and the valve body 40 may be prevented from abutting on each other when the fluid is introduced into the space 11, no stress is applied from the valve body 40 to the seal member 60, which makes it possible to prevent the wear and deterioration of the seal member 60 due to friction caused by rotation of the valve body 40.

In the present embodiment, in order to further improve the fluid tightness of the seal member 60 with the valve body 40 when the fluid introduction path 20 is blocked by the valve body 40, the biasing member 70 is provided to bias the seal member 60 from the upstream side of the fluid introduction path 20 toward the valve body 40 side. In the present embodiment, the biasing member 70 is a coil-shaped spring and is fitted between a groove 16 in the housing 10 and a flange 200 such that the axis of the spring is in the axial direction. Thus, the biasing force of the biasing member 70 acts along the axial direction.

In the present embodiment, the restricting mechanism 80 is provided between the seal member 60 and the biasing member 70 to restrict the amount by which the seal member 60 protrudes to prevent the tip end 61 of the seal member 60 on the valve body 40 side from protruding to the valve body 40 side beyond the second inner radius. The restricting mechanism 80 is formed in an annular shape by processing a thin plate. In particular, in the present embodiment, as illustrated in FIG. 7, the restricting mechanism 80 is formed with a plurality of surfaces orthogonal to the axial direction which are formed in a stepwise manner along the axial direction. A first step portion 81 on the biasing member 70 side is pressed against a wall portion 17 of the groove 16 in the housing 10 by the biasing force of the biasing member 70, and a second step portion 82 on the valve body 40 side is provided to face one axial end of the seal member 60. The seal member 60 is provided on the end of the restricting mechanism 80 on the valve body 40 side by adhesion, for example, such that the seal member 60 and the restricting mechanism 80 are integrally moved in the axial direction. Thus, the seal member 60 does not further protrude in the axis X direction in a state where the first step portion 81 abuts on the wall 17 of the groove 16. Thus, the seal member 60 does not abut on the small radius portion 42. Meanwhile, as illustrated in FIG. 7, the seal member 60 intersects with the large radius portion 41 indicated by a two-dot chain line in a state where the seal member 60 protrudes most in the axis X direction. Therefore, when the tip end 61 of the seal member 60 abuts on the large radius portion 41, the seal member 60 moves radially outward from the axis X against the biasing force of the biasing member 70. At this time, the first step portion 81 of the restricting mechanism 80 is in a state of being separated from the wall portion 17 of the groove 16 in the housing 10, and the biasing force of the biasing member 70 directly acts on the seal member 60. That is, the biasing force of the biasing member 70 is the force of biasing the seal member 60 against the valve body 40.

As illustrated in FIGS. 3 and 4, in the present embodiment, a biasing member 110 formed of a coil-shaped spring is provided in each of the opening 15 in the first fluid discharge path 31 and the opening 15 in the second fluid discharge path 32, a seal member 111 formed of an annular elastic member (e.g., a rubber member) is provided on the upstream side (the space 11 side) of the biasing member 110, and furthermore, an annular resin member 112 (e.g., formed of poly tetrafluoroethylene) is provided on the upstream side of the seal member 111. Since polytetrafluoroethylene has high slidability and high wear resistance, this configuration may secure the sealability between the respective openings 15 in the plurality of fluid discharge paths 30 and the valve body 40 and may prevent the wear of the resin member 112.

Here, in a system in which the valve device 1 is used (in the present embodiment, the vehicle fuel cell system 100), when each of the plurality of fluid discharge paths 30 is configured to allow an error in the diversion ratio, the sealability between the valve body 40 the fluid discharge path 30 which is limited in the communication state with the fluid introduction path 20 among the plurality of fluid discharge paths 30 may be less that the sealability between the fluid introduction path 20 and the valve body 40. In such a case, a seal mechanism such as the biasing member 110, the seal member 111, and the resin member 112 provided in each of the plurality of fluid discharge paths 30 may be unnecessary.

In the present embodiment, the valve device 1 is configured as described above. According to such a valve device 1, since the intermediate portion 43 is provided between the large radius portion 41 and the small radius portion 42 and furthermore, since the valve body 40 is formed of a spherical body, when the valve body 40 is rotated and the large radius portion 41 abuts on the housing 10, the valve body 40 is smoothly pressed onto (gradually abuts on) the housing 10 (the housing 10 around the opening 14 in the fluid introduction path 20) until it gradually reaches the large radius portion 41 from the small radius portion 42. Thus, deterioration of the valve body 40 may be prevented while maintaining the sealability. Further, according to the valve device 1, since the plurality of fluid discharge paths 30 may be switched, a reduction in the cost of the valve device 1 may be achieved as compared with a case where the valve device 1 is provided for each fluid discharge path 30.

By configuring as described above, the valve device 1 may control the amount of humidification of air supplied to the stack 2 of the vehicle fuel cell system 100 and the supply of air to the stack 2.

OTHER EMBODIMENTS

The above embodiment has described an example in which the valve device 1 controls the amount of humidification of air supplied to the stack 2 of the vehicle fuel cell system 100 and the supply of air to the stack 2, but the valve device 1 may also be applied to other applications.

The above embodiment has described an example in which the housing 10 has two fluid discharge paths 30, but the housing 10 may have three or more fluid discharge paths 30. Furthermore, the valve device 1 may also be applied to an example in which the total number of fluid introduction paths 20 and fluid discharge paths 30 is three or more. That is, the valve device 1 may also be applied to an example having a plurality of fluid introduction paths 20 and at least one fluid discharge path 30.

The above embodiment has described that the valve body 40 is configured to have the large radius portion 41, the small radius portion 42, and the intermediate portion 43, but the valve body 40 may be configured to have a uniform inner radius, i.e., to have only the large radius portion 41.

The above embodiment has described that the distance from the axis X of the cylindrical space 11 to the tip end of the protrusion 55 is greater than the second inner radius has been described, but the distance from the axis to the tip end of the protrusion 55 may be equal to the second inner radius.

The above embodiment has described that the biasing member 110 formed of a coil-shaped spring is provided in each of the opening 15 in the first fluid discharge path 31 and the opening 15 in the second fluid discharge path 32, the seal member 111 formed of an annular elastic member (e.g., a rubber member) is provided on the upstream side (the space 11 side) of the biasing member 110, and furthermore, the annular resin member 112 (e.g., polytetrafluoroethylene) is provided on the upstream side of the seal member 111, but the restricting mechanism 80 may also be provided in the first fluid discharge path 31 and the second fluid discharge path 32 similarly to the fluid introduction path 20.

The above embodiment has described that the seal member 60 is provided in a state where the tip end 61 on the valve body 40 side abuts on the large radius portion 41 of the valve body 40 and does not abut on the small radius portion 42, but the seal member 60 may be provided in a state where the tip end 61 on the valve body 40 side abuts on both the large radius portion 41 and the small radius portion 42 of the valve body 40.

The above embodiment has described that the fluid introduction path 20 is provided with the biasing member 70 and the restricting mechanism 80, but the fluid introduction path 20 may be configured without both the biasing member 70 and the restricting mechanism 80. Alternatively, only the biasing member 70 may be provided in the fluid introduction path 20. Further, at least one of the plurality of fluid discharge paths 30 may be configured to have both the biasing member 70 and the restricting mechanism 80, or may be configured to have only the biasing member 70.

The above embodiment has described that the sealability between the valve body 40 and the fluid discharge path 30 which is limited in the communication state with the fluid introduction path 20 among the plurality of fluid discharge paths 30 is less than the sealability between the fluid introduction path 20 and the valve body 40, but the sealability between the valve body 40 and the fluid discharge path 30 which is limited in the communication state with the fluid introduction path 20 among the plurality of fluid discharge paths 30 may be similar to the sealability between the fluid introduction path 20 and the valve body 40.

The above embodiment has described that the valve body 40 is formed using a resin. When the valve body 40 is formed by resin molding, a parting line may be located at the small radius portion 42. With such a configuration, since the surface of the large radius portion 41 may be smoothed, the wear and breakage of the seal member 60 due to a protruding resin portion at the parting line may be prevented, and the sealability may be ensured for a long time. Of course, the valve body 40 may also be configured using a metal instead of a resin.

Figure 8:
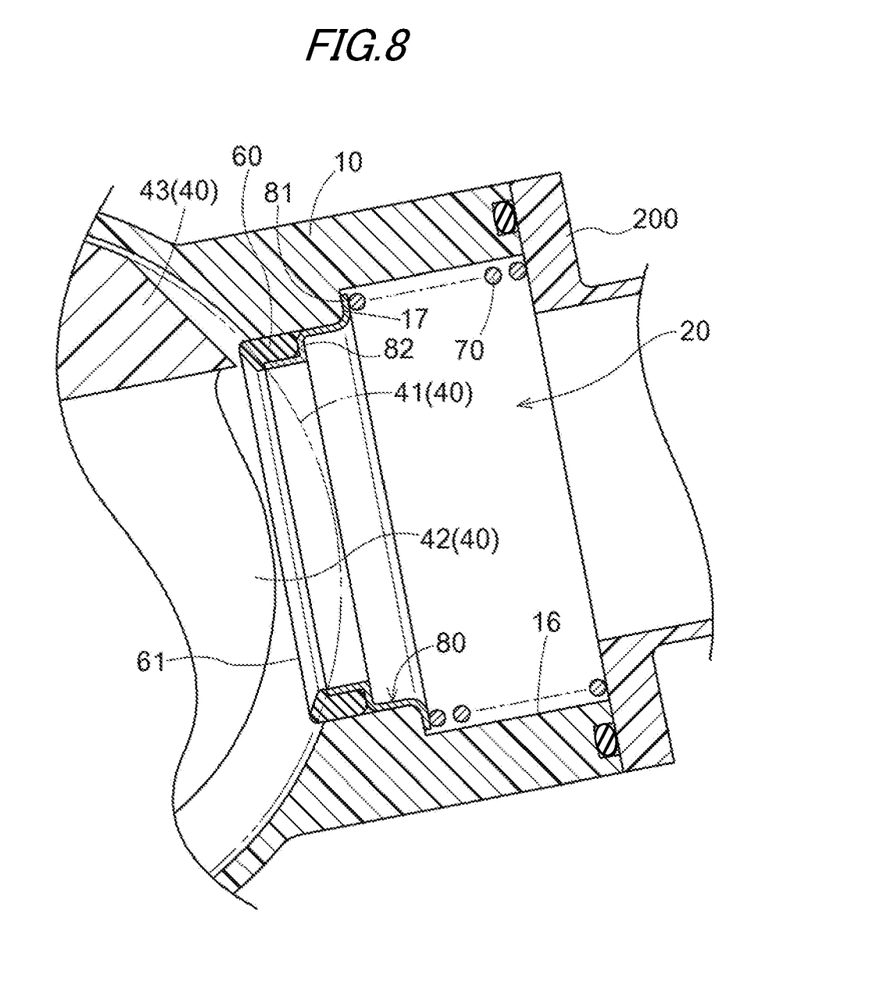
FIG. 8 is an enlarged view of a seal portion different from FIG. 7.

FIG. 8 is an enlarged view of a seal portion in a region (around the small radius portion 42) different from FIG. 7.

The valve body 40 illustrated in FIG. 7 may have therein the opening 44 which is opened in at least one of the small radius portion 42 and the intermediate portion 43 and may have therein the communication path 45 which allows communication between the fluid introduction path 20 and at least one of the plurality of fluid discharge path 30.

In addition, the seal member 60 is provided in the opening 14 in the fluid introduction path 20 at the inner peripheral wall 12 of the housing 10 (between the opening 14 and the inner peripheral wall 12 of the housing 10) so as to able to abut on the large radius portion 41 of the valve body 40. In the present embodiment, the seal member 60 is provided on the protrusion 55 and is provided so as to abut on the valve body 40. The seal member 60 is formed according to the shape of the opening 14 (in the present embodiment, the shape of the inner peripheral surface 55A of the end of the protrusion 55).

This disclosure may be used in a valve device capable of limiting the communication between the fluid introduction path and the fluid discharge path.

A feature of a valve device according to an aspect of this disclosure resides in that the valve device includes a housing having a cylindrical inner peripheral wall that defines a cylindrical space therein, a fluid introduction path formed in the housing to communicate with the cylindrical space at the inner peripheral wall, a plurality of fluid discharge paths formed in the housing to communicate with the cylindrical space at the inner peripheral wall, a valve body accommodated in the cylindrical space, the valve body being formed of a spherical body having therein a communication path that communicates the fluid introduction path with at least one of the plurality of fluid discharge paths, a valve body rotating mechanism configured to rotate the valve body about an axis of the cylindrical space as a rotation axis in the cylindrical space, a protrusion protruding from the inner peripheral wall of the housing toward the axis of the cylindrical space to surround at least a portion of an opening in the fluid introduction path at the inner peripheral wall of the housing, and a seal member provided on the protrusion and capable of abutting on the valve body.

With such a characteristic configuration, since the housing having the cylindrical inner peripheral wall and the valve body as the spherical body are provided, it is possible to prevent deterioration of the sealability due to the displacement in the circumferential direction with respect to the inner peripheral wall of the housing. Thus, it is possible to realize the valve device having excellent sealability with a simplified configuration.

It is preferable that, when the valve body is viewed along the axis, the valve body includes a large radius portion formed with a predetermined first inner radius corresponding to an inner radius of the inner peripheral wall of the housing, a small radius portion formed with a second inner radius less than the first inner radius, and an intermediate portion formed to connect the large radius portion and the small radius portion and having a distance from the axis that is intermediate in size between the first inner radius and the second inner radius, and a distance from the axis to a tip end of the protrusion is greater than the second inner radius.

With such a configuration, by providing the valve body with the large radius portion, the small radius portion, and the intermediate portion, it is possible to provide the large radius portion with a sealing function and to prevent pinching or biting of the seal member between the intermediate portion or the small radius portion and the inner peripheral wall of the housing at the time of rotation of the valve body. Further, since it is possible to prevent interference between the large radius portion and the protrusion by assembling the valve body in the space in a state where the small radius portion or the intermediate portion faces the protrusion, it is possible to easily perform the assembling.

It is preferable that the valve device further includes a biasing member configured to bias the seal member from an upstream side of the fluid introduction path toward a valve body side and a restricting mechanism configured to restrict a tip end of the seal member on the valve body side so as not to protrude to the valve body side beyond the second inner radius.

With such a configuration, since the seal member is biased to the large radius portion by the biasing member to enhance the fluid tightness with the valve body and the seal member does not abut on the small radius portion, it is possible to prevent the wear and deterioration of the seal member due to friction caused by rotation of the valve body.

The valve device according to the aspect of this disclosure may be configured as follows.

That is, the valve device includes a housing having a cylindrical inner peripheral wall defining a cylindrical space therein, a fluid introduction path formed in the housing to communicate with the cylindrical space at the inner peripheral wall, a plurality of fluid discharge paths formed in the housing to communicate with the cylindrical space at the inner peripheral wall, a valve body accommodated in the cylindrical space and including, when viewed along an axis of the cylindrical space, a large radius portion formed with a predetermined first inner radius corresponding to an inner radius of the inner peripheral wall of the housing, a small radius portion formed with a second inner radius less than the first inner radius, and an intermediate portion formed to connect the large radius portion and the small radius portion and having a distance from the axis that is intermediate in size between the first inner radius and the second inner radius, the valve body being formed of a spherical body having an opening that is opened in at least one of the small radius portion and the intermediate portion and also having therein a communication path capable of communicating the fluid introduction path with at least one of the plurality of fluid discharge paths, and a valve body rotating mechanism configured to rotate the valve body about the axis as a rotation axis in the cylindrical space.

With such a characteristic configuration, since the intermediate portion is provided between the large radius portion and the small radius portion, and furthermore, since the valve body is formed of a spherical body, when the valve body is rotated and the large radius portion abuts on the housing, the valve body is smoothly pressed onto (gradually abuts on) the housing (the housing around the opening in the fluid introduction path) until it gradually reaches the large radius portion from the small radius portion. Thus, it is possible to prevent deterioration of the valve body while maintaining the sealability. Further, according to the valve device, since it is possible to switch the plurality of fluid discharge paths, it is possible to reduce the cost of the valve device as compared with a case where the valve device is provided for each fluid discharge path.

It is preferable that a seal member capable of abutting on the large radius portion of the valve body is provided between the opening in the fluid introduction path at the inner peripheral wall of the housing and the inner peripheral wall of the housing.

With such a configuration, by the intermediate portion provided between the large radius portion and the small radius portion, it is possible to gradually vary the biasing force acting on the seal member when the valve body is rotated, and the seal member abuts on the large radius portion. Thus, it is possible to prevent rapid deformation in the rotational direction of the valve body of the seal member and deterioration due to the wear of the seal member.

It is preferable that the seal member is provided in a state where a tip end thereof on a valve body side abuts on the large radius portion of the valve body and does not abut on the small radius portion.

With such a configuration, since the valve body is rotated without the seal member coming into contact with the small radius portion located in the vicinity of the seal member during the flow of the fluid, it is possible to reduce sliding resistance. Thus, it is possible to miniaturize the valve body rotating mechanism which rotates the valve body. Furthermore, since it is possible to shorten the sliding distance between the valve body and the seal member, it is possible to prevent the deterioration of the seal member due to wear and to improve the durability of the seal member. Thus, for example, since it is possible to realize required sealability using an inexpensive rubber material, it is possible to reduce the cost of the valve device.

It is preferable that the valve device further includes a biasing member configured to bias the seal member from an upstream side of the fluid introduction path toward the valve body side and a restricting mechanism configured to restrict the tip end of the seal member on the valve body side so as not to protrude to the valve body side beyond the second inner radius.

With such a configuration, since the seal member is biased to the large radius portion by the biasing member to enhance the fluid tightness with the valve body and the seal member does not abut on the small radius portion, it is possible to prevent the wear and deterioration of the seal member due to friction caused by rotation of the valve body.

Sealability between the fluid discharge path that is limited in a communication state with the fluid introduction path among the plurality of fluid discharge paths and the valve body may be less than sealability between the fluid introduction path and the valve body.

With such a configuration, it is possible to reduce the cost required for sealing in the fluid discharge path. Thus, it is possible to reduce the cost of the valve device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve device comprising:
a housing having a cylindrical inner peripheral wall defining a cylindrical space therein;
a fluid introduction path formed in the housing to communicate with the cylindrical space at the inner peripheral wall;
a plurality of fluid discharge paths formed in the housing to communicate with the cylindrical space at the inner peripheral wall;
a valve body accommodated in the cylindrical space and including, when viewed along an axis of the cylindrical space,
a large radius portion formed with a predetermined first inner radius corresponding to an inner radius of the inner peripheral wall of the housing,
a small radius portion formed with a second inner radius less than the first inner radius, and
an intermediate portion formed to connect the large radius portion and the small radius portion and having a distance from the axis that is intermediate in size between the first inner radius and the second inner radius, the intermediate portion includes a straight portion disposed at one end of the large radius portion,
the valve body being formed of a spherical body having an opening that is opened in at least one of the small radius portion and the intermediate portion and also having therein a communication path capable of communicating the fluid introduction path with at least one of the plurality of fluid discharge paths; and
a valve body rotating mechanism configured to rotate the valve body about the axis as a rotation axis in the cylindrical space.

2. The valve device according to claim 1, wherein
a seal member capable of abutting on the large radius portion of the valve body is provided between the opening in the fluid introduction path at the inner peripheral wall of the housing and the inner peripheral wall of the housing.

3. The valve device according to claim 2, wherein
the seal member is provided in a manner in which a tip end thereof on a valve body side abuts on the large radius portion of the valve body and does not abut on the small radius portion.

4. The valve device according to claim 2, further comprising:
a biasing member configured to bias the seal member from an upstream side of the fluid introduction path toward the valve body side; and
a restricting mechanism configured to restrict a tip end of the seal member on a valve body side so as not to protrude to the valve body side beyond the second inner radius.

5. The valve device according to claim 1, wherein the valve body is configured such that sealability between the fluid discharge path that is limited in a communication state with the fluid introduction path among the plurality of fluid discharge paths and the valve body is less than sealability between the fluid introduction path and the valve body.

6. The valve device according to claim 1, wherein the valve body further includes, when viewed along the axis of the cylindrical space, a second straight portion disposed at an other end of the large radius portion.

* * * * *